(12) United States Patent
Barmatov et al.

(10) Patent No.: US 7,718,583 B2
(45) Date of Patent: May 18, 2010

(54) PARTICULATE MATERIAL FOR PROPPANT FLOWBACK CONTROL

(75) Inventors: Evgeny Borisovich Barmatov, Sipachi (RU); Konstantin Mikhailovich Lyapunov, Novosibirsk (RU); Alexander Victorovich Golovin, Livny (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/055,358

(22) Filed: Mar. 26, 2008

(65) Prior Publication Data

US 2008/0236825 A1 Oct. 2, 2008

(30) Foreign Application Priority Data

Mar. 26, 2007 (RU) .............................. 2007110908

(51) Int. Cl.
*C09K 8/60* (2006.01)
(52) U.S. Cl. .................................... 507/219; 166/280.1
(58) Field of Classification Search ................. 507/219; 166/280.1
See application file for complete search history.

(56) References Cited

U.S. PATENT DOCUMENTS

| | | | | |
|---|---|---|---|---|
| 3,250,329 | A | * | 5/1966 | Prats .......................... 166/292 |
| 5,218,038 | A | | 6/1993 | Johnson et al. |
| 5,330,005 | A | | 7/1994 | Card et al. |
| 5,501,274 | A | | 3/1996 | Nguyen et al. |
| 5,582,249 | A | | 12/1996 | Caveny et al. |
| 5,697,440 | A | | 12/1997 | Weaver et al. |
| 5,908,073 | A | | 6/1999 | Nguyen et al. |
| 6,059,034 | A | | 5/2000 | Rickards et al. |
| 6,209,643 | B1 | | 4/2001 | Nguyen et al. |
| 6,330,916 | B1 | | 12/2001 | Rickards et al. |
| 6,742,590 | B1 | | 6/2004 | Nguyen |
| 6,830,105 | B2 | | 12/2004 | Thesing |
| 7,032,667 | B2 | | 4/2006 | Nguyen et al. |
| 2007/0021309 | A1 | * | 1/2007 | Bicerano .................... 507/219 |

FOREIGN PATENT DOCUMENTS

EP 0735235 10/1996

* cited by examiner

*Primary Examiner*—Timothy J. Kugel
*Assistant Examiner*—Atnaf Admasu
(74) *Attorney, Agent, or Firm*—David Cate; Robin Nava; Jeff Griffin

(57) ABSTRACT

Particulate material used for proppant flowback control from the fracture, where the material is a polymer which increases its hardness under downhole conditions.

3 Claims, No Drawings

PARTICULATE MATERIAL FOR PROPPANT FLOWBACK CONTROL

This application claims foreign priority benefits to Russian Patent Application No. 2007110908, filed on Mar. 26, 2007.

BACKGROUND

The statements in this section merely provide background information related to the present disclosure and may not constitute prior art.

This invention relates to oil and gas industry, particularly, to methods of reservoir stimulation during production and to methods of proppant flowback control.

A serious problem in oil production is flowback of proppant from the fracture back to the well: this happens after hydraulic fracturing of formation, during the first cleanup, and sometimes after well completion. The literature data show that up to 20% of the pumped proppant is usually removed from a fracture during fracture cleanup and production, and this causes several adverse consequences. In wells with a low production rate, the removed proppant may deposit on the casing; this situation requires regular cleanup and makes costly the repair operations. Another problem that can be caused by high proppant flowback rate is a failure or fast depreciation of electrical submersible pumps (ESP). Proppant flowback reduces the fracture conductivity due to fracture thickness loss; this reduces the well production rate.

There exist several known methods for proppant flowback control.

A widespread method is based on using a proppant with curable resin coating which is pumped to the fracture at the final stage of fracturing treatment. But the application of this proppant is restricted by secondary reaction of the resin coating with the fracturing fluid. These reactions cause partial degradation of resin coating and reduce the strength of bonding between RCP particles and the strength of the proppant packing. Besides, chemical reaction between the resin coating and fracturing fluid results in uncontrollable changes in the fluid rheology; this also affects the hydrofracturing efficiency. All the listed factors and cyclic loading caused by well opening/closure may be detrimental for the proppant packing strength.

A mixture of proppant with adhesive polymer materials can be used for proppant flowback control. Adhesive material comes in contact with proppant and makes a thin and tacking coating. This material facilitates adhesion between particulate and sand or/and crashed fines; this stops completely or partially the proppant flowback from the fracture. The typical feature of adhesive coating is that particles remain tacky for a long time even at elevated downhole temperatures without cross-linking or solidifying.

Adhesive materials can be matched with other reactants used in the hydrofracturing treatment, e.g., with inhibitors, bactericide agents, gel breaker, paraffin and corrosion inhibitors.

The U.S. Pat. No. 7,032,667 teaches about fracture propping with use of tacky agents and resin-coated proppant.

The U.S. Pat. No. 6,742,590 discloses the method of proppant flowback control by mixing of tacky materials with deformable particles (every component is already effective tool for flowback control).

Another kind of material suitable for proppant flowback control is thermoplastic materials. Thermoplastic compound is mixed with proppant, then it melts at a higher subterranean temperature and sticks to proppant; this creates aggregates of adhered proppant.

The U.S. Pat. No. 5,697,440 describes the method of application of thermoplastic material with resin-coated proppant.

The U.S. Pat. No. 6,830,105 teaches about the method for proppant flowback control, wherein the thermoplastic elastomer is mixed with proppant as a liquid (or a solution with appropriate solvent). Then the dissolved elastomer is cured independently or with curing agent producing a thermoplastic coating.

The U.S. Pat. No. 5,330,005 describes the method for proppant flowback control through mixing of a regular proppant with fiber material. Fibers intermingle with proppant pack and reduce flowback. Besides the strengthening of the proppant pack, added fibers redistribute the loads, making bridges on the most part of proppant pack area. A fiber-hold structure is more flexible than that composed of resin coated proppant: it allows small shifts in the proppant-fiber packing without loss in strength.

One approach is a fiber bundle of 5 to 200 separate fibers collected with the length from 0.8 to 2.5 mm and the diameter ranging from 10 to 1000 microns. These bundles are usually fixed at one end.

Mechanisms of using deformable, thermoplastic, and elastomeric materials for proppant flowback control is based on indenting of proppant particulate into deformable material. U.S. Pat. No. 6,059,034 describes deformable beaded particulate. Deformable particulate facilitates effective redistribution of stresses inside the packing, and improves the packing strength due to a higher contact area between the particles. A serious drawback of this soft material in a significant reduction in the free pore space in particulate packing because particles penetrate the pores and reduce the fracture permeability and, ultimately, the well production.

On another side, if we take a hard material, this is better for packing permeability, but also reduces the solid proppant penetration into the deformable material. The result is a lower strength of packing and danger of proppant flowback.

DESCRIPTION OF THE INVENTION

Some embodiments relate to production of core-and-coating particulates. The composite particulate comprises a first deformable material and a second deformable material (the core is deformable, but harder than the protective coating). The core material of deformable particulate material comprising at least one of ground or crushed nut shells, ground or crushed seed shells, ground or crushed fruit pits, processed wood, or a mixture thereof. The coating material is polymer. Deformable particulate material has a shape comprising at least one of beaded, oval, cubic, bar-shaped, cylindrical, polyhedron, irregular-shaped, conical, but preferably with a maximum length-based aspect ratio of equal to or less than 5.

This gives us the criteria for a product suitable for reduction of proppant flowback. The particulate must have controllable hardness during well completion and remain very hard during production period. In other words, a moderate hardness of particulate facilitates indentation of proppant grains into deformable material; this improves redistribution of stresses in the proppant packing and reduces the percentage of crashed proppant material and increase the packing strength. But during production stage the material hardness sustains a higher permeability of a packing and holds proppant in the fracture.

In this invention document, the definition of "hardness" means a resistance of given material to indentation of other bodies.

The hardness can be measured by Brinell, Rockwell, or Vickers' methods which based on steel ball or diamond/steel cone or pyramid embedment in to tested material and subsequent analyzes of embedment depth or print size. There are some other characteristics, concerned with materials hardness like Young modulus, Poisson ratio, yields strength, failing stress, etc.

The technical task is development of a new material in the form of particulate with controllable hardness under subterranean fracture conditions.

The technical result of the disclosed invention is redistribution of stresses in the proppant packing in the hydrofracture, and reduction of its failure: this reduces considerably the proppant blowback on the stages of washing and completion of well, and also during the well production period. Meanwhile, the permeability of proppant packing does not deteriorate in the long-run production period.

The invention proposes method of fracture propping by mixture of conventional proppant with polymer particles having controllable hardness in a fracture conditions, which prevent proppant flowback and as well as maintain the fracture conductivity.

The hardness of polymer particles in downhole conditions increases due to additional polymerization of material due to heating in the downhole conditions or/and due to injected curing agents operating only at the downhole temperatures, or due to chemical reactions between polymer with water, crude oil (or its components) or with gas condensate.

All methods directed to creation materials having controllable hardness can be divided in to two main groups.

1. The first group of methods is related to temperature effect on materials. Short-term or long-term temperature impact on the material could be used as a mechanism for particles hardening. But this temperature should not be greatly higher than the degradation point for material. Hardness growth is caused by chemical reactions and intermolecular cross-linking inside the material (generally in polymers), which results in molecular weight growing and increasing of degree of cross-link of polymer network. Long-term temperature influence in a number of cases can lead to increasing in the glass transition temperature and crystallinity degree of polymers. In turn, this causes material hardening at a certain temperature.

For this group, particulate is made of a polymer comprising functional monomers which at higher temperature initiate inter- and intra- molecule cross-linking making the macromolecule more rigid, with higher molecular mass and higher cross-linking degree. The content of functional monomer units in the polymer varies from 0.01 to about 30% wt.

The functional monomer units include following groups: carboxylic, amino, sulphide, vinyl, acrylic, coumarin, stylbene, hydroxylic, phenol, aldehyde, isocyanate, epoxy, glycidyl and their combination. Material comprises of polymers, containing certain portion of residual unreacted monomeric or oligomeric compounds, two-, three-, or poly-functional monomers, preferably acrylic and meta-acrylic (cross-linkers) capable of post-polymerization by radial mechanism with formation of three-dimensional polymer web. The content of compounds capable for post-polymerization varies from 0.01 to about 40% wt. Compounds capable to polycondensation in downhole condition comprise resol and novolac phenol-formaldehyde resin.

2. Another group of methods includes the hardness increasing due to materials interactions with crude oil, gas condensate or subterranean water at the production stage. Partial or complete ablation or dilution of plasticizers or modifiers, which usually used as additives to polymers for decreasing of viscosity, glass transition or melting temperature, coefficient of elasticity and flow point, leads to increase of material hardness. Chemical interaction between polymers and some compounds, containing in oil or gas condensate, can change polymers characteristics as well. For example, polymers interaction with sulfur containing compounds leads to cross-linking of polymer chains, which causes higher glass transition temperature, makes higher the elasticity module, flow point, and polymer hardness.

Polymer materials are able to cross-linking in presence of sulfur-containing chemical substances (for example, hydrogen sulphide, mercaptans) containing in oil or gas condensate that increase their hardness.

The plasticizers content in polymer can very in range of 0.01 till 60% by weight of total material. Plasticizers comprises the following classes of chemical substances: esters of aromatic and aliphatic carboxylic acid, esters of glycols and monocarbonic acids, esters of phosphoric acid, polyesters, epoxy compounds, vegetable oil and their blends.

Plasticizers comprise di(2-ethylhexyl)phthalate; butyl benzyl phthalate; dicyclohexyl phthalate; derivatives of trimellitic and pyromellitic acids; esters of triethylene glycol and aliphatic monocarbonic C6-C9 acids; benzoic acid eaters; tricresyl-, tributyl-, triphenyl phosphates; compound of polycondensation of dicarbonic acids, for example, adipinic acid, sebacic acid, azelaic acid, phthalic acid, with polyols, for example, diethyleneglycol, 1,2-propanediol, 1,3-butanediol; compound of interesterification between esters of dicarbonic acids and polyols with average molecular weight about 2000; soybean oil/epoxy-based composites; esters of fatty acids and tall oil; colophony; linseed-oil; rapeseed oil; oligoester acrylate; trimethaacryltrimethylproane; esters of stearic, oleic and lauric acids; wax and their blends.

Aging inhibitors can be added to polymer for both groups of materials. The aging inhibitors content range varies between about 0.01 to about 20% by weight of polymer. Aging inhibitor comprises phenyl naphthylamine, 2,6-di-tert-butyl-4-methylphenol, lead stearate, barium stearate, calcium stearate, tin stearate, tin dilauryl dibutyl, epoxy resin, pyrocatechine phosphorous acid ester and their blends.

Material comprises compounded polymeric system composed of polymer containing solid or liquid organic or inorganic compounds (filler compounds), which are distributed in a polymer phase and have distinct phase separation. The filler compound content range between about 0.01 to about 40% by weight of polymer. Filler compounds comprise chemical substance dissoluble in water, crude oil or gas condensate. The filler compounds comprise metal salts; paraffin's; oil-soluble polymers, for example, polyethylene, polypropylene; water soluble polymers, for example, polylactic acid, polyacrylic and polymethacrylic acids and its copolymers; polyanhydride and their blends.

The particles size of material with controllable hardness in reservoir conditions ranges between about 4 to about 60 meshes.

New material and proppant can be mixed beforehand or during hydrofracturing treatment. The concentration of material in a mixture comprises from about 0.01 to about 60% by weight of proppant.

In particularly, the method can be embodied using the particulate material of polyvinylchloride (PCV).

Below we demonstrate an opportunity for controllable change of polymer particulate hardness through thermal impact of downhole conditions. With an example of a polymer belonging to a wide class of thermoplastics, we can evaluate the efficiency of thermal effect and crude oil-material interaction as a process for achieving a higher hardness of polymer compounds.

In our experiments, a sample of polyvinylchloride (PVC) was kept in crude oil at temperature of 110° C. for 18 days (the crude from Yuzhnopriobskoe oilfield). Two types of PVC were tested: one with plasticizing agent and the second without plasticizing agent or stabilizer. The polymer thermomechanical analysis was carried out at the device Instrument TMA Q400 equipped with data processing software Universal Analysis 2000. The sample size was 6.0×4.0×0.3 mm. Differential scanning calorimetry (DSC) was carried out with DSK Q200 at the temperature growth rate of 10 grad/min. All measurements satisfied the standards ISO 178, ISO 11359, GOST 9550-71. The glass transition was measured by DSC and TMA methods (from the temperature curve for mechanical dissipation tangent tgδ).

The Table presents main characteristics of the PVC sample before and after temperature treatment: the glass transition temperature and Young module. One can see that the duration of heat treatment increases the glass transition and the Young module. This testifies about growing polymer hardness due to contact with crude at a high reservoir temperature. Another side of this phenomenon is well-known PVC aging: this is accompanied by release of HCl and formation of double bonds in PVC macromolecules, facilitating the additional polymer cross-linking.

For a PVC sample with a plasticizing agent, the thermal treatment in crude oil also results in increasing of polymer hardness. For example, for the initial polymer the flow point was −12° C., but after one week of treatment in hot oil this temperature increased up to 54° C.: this testifies about washing out of plasticizing agent from the polymer particulate and additional cross-linking in PVC macromolecules.

TABLE 1

| Sample | Glass transition, ° C. | | Young module, GPa | |
|---|---|---|---|---|
| | DSC | TMA (tgδ) | 30° C. | 90° C. |
| PVC | 46 | 56 | 1.9 | — |
| PVC-7* | 55 | 77 | 3.0 | 1.1 |
| PVC-18* | 64 | 76 | 3.3 | 2.0 |

*days of thermal treatment.

The invented method becomes more efficient is the forced fracture closure is applied.

The hydrofracturing treatment using a material with controllable hardness ensures a reduction of proppant flowback and helps to keep a high permeability of reservoir.

What is claimed is:

1. A particulate material useful for proppant flowback control from a fracture, wherein the particulate material is a polymer material which increases its hardness under downhole conditions due to reaction with oil, gas condensate or water during the production stage.

2. The particulate material of claim 1, wherein the polymer material increases its hardness at high temperature.

3. The particulate material of claim 1, wherein the polymer material becomes harder due to chemical interaction with components of oil or gas condensate.

* * * * *